(12) United States Patent
Blais-Morin et al.

(10) Patent No.: US 7,379,599 B1
(45) Date of Patent: *May 27, 2008

(54) MODEL BASED OBJECT RECOGNITION METHOD USING A TEXTURE ENGINE

(75) Inventors: Louis-Antoine Blais-Morin, Montréal (CA); Stéphane Baldo, Montréal (CA)

(73) Assignee: Matrox Electronic Systems Ltd, Dorval, Quebec (CA)

( * ) Notice: Subject to any disclaimer, the term of this patent is extended or adjusted under 35 U.S.C. 154(b) by 579 days.

This patent is subject to a terminal disclaimer.

(21) Appl. No.: 10/629,578

(22) Filed: Jul. 30, 2003

(51) Int. Cl.
*G06K 9/64* (2006.01)
*G06K 9/68* (2006.01)

(52) U.S. Cl. .................. 382/217; 345/502; 345/552; 382/103; 382/280

(58) Field of Classification Search ............. 345/502, 345/506, 522, 552; 382/209, 217, 103, 218, 382/280
See application file for complete search history.

(56) References Cited

U.S. PATENT DOCUMENTS

| | | | | |
|---|---|---|---|---|
| 5,911,035 A | * | 6/1999 | Tsao | 706/16 |
| 6,384,833 B1 | * | 5/2002 | Denneau et al. | 345/522 |
| 7,027,651 B2 | * | 4/2006 | Simon et al. | 382/217 |
| 2002/0114518 A1 | | 8/2002 | Wilt | |
| 2004/0165775 A1 | * | 8/2004 | Simon et al. | 382/181 |
| 2005/0286767 A1 | * | 12/2005 | Hager et al. | 382/190 |
| 2006/0126493 A1 | * | 6/2006 | Hashem et al. | 370/208 |

OTHER PUBLICATIONS

Lamdand et al, Object Recognition by Affine Invariant Matchin, 1988, IEEE Intern. Conf. Comput. Vison Pattern Recognition pp. 335-344.*
Tsai. "Robust Affine Invariant Matching with Application to Line Features." Proc. IEEE Computer Society Conference on Computer Vision and Pattern Recognition, Jun. 15, 1993 pp. 393-399.*

* cited by examiner

*Primary Examiner*—Gregory Desire
(74) *Attorney, Agent, or Firm*—Ogilvy Renault LLP

(57) ABSTRACT

A geometric hashing method usable by a machine vision system for model-based recognition of an object. More specifically, in a computer having a texture engine, a method of pattern matching for recognition of objects within an image. The method comprises the following steps: deriving at least one target primitive representative of the image; forming at least one basis from at least one target primitive; in the texture engine, determining, for each one of the at least one basis, an affine invariant representation of the at least one target primitives; and identifying, using the affine invariant representation, at least one predefined model primitives that at least partially matches the at least one target primitives.

13 Claims, 9 Drawing Sheets

MODEL BASED OBJECT RECOGNITION METHOD USING A TEXTURE ENGINE

FIELD OF THE INVENTION

The invention relates to machine vision and more particularly to a geometric hashing method usable by a machine vision system for model-based recognition of an object.

BACKGROUND OF THE INVENTION

Techniques of visual object (and/or pattern) recognition are increasingly important in automated manufacturing, biomedical engineering, cartography and many other fields. Model-based recognition techniques typically must solve the problem of finding, in an image acquired by a camera, an occurrence of a previously defined model that has been affected by affine transformation. Affine transformations are those in which straight lines remain straight and parallelism is preserved. Furthermore, in affine transformations, angles of an object in relation to a coordinate system may undergo changes and differential scale changes may be introduced.

Geometric hashing, as described in "Geometric hashing: A generalized and Efficient Model-Based Recognition Scheme" (Y. Lamdan and H. J. Wolfson, Second International Conference on Computer Vision, December 1988, pp 238-249), and "Affine Invariant Model-Based Object Recognition" (Y. Lamdan, J. T. Schwartz, H. J. Wolfson, IEEE Transactions on Robotics and Automation, Vol. 6, No. 5, October 1990) has been proposed as a method of finding occurrences between an image and a model with affine transformation and partial occlusion.

In known geometric hashing methods, models of objects are represented by geometric primitives. Geometric primitives of the models are referred to herein as model primitives. The geometric primitives can be either object geometric features, such as ends of lines, corners, edge points, etc., or sets of these geometric features, such as line segments, lines, etc. For each triplet, couple or single representation of geometric primitives (according to the type of primitive chosen), a respective coordinate system is defined using the involved geometric primitives as a basis. For example, in the method defined by Lamdan and Wolfson, geometric primitives are interest points. Each triplet of interest points defines a basis. The location of each of the other interest points can then be calculated within the respective coordinate system, to produce a representation of the interest points that is affine invariant. For each coordinate system (basis), the calculated coordinates of each interest point is then used as an index to reference a corresponding bin of a hash table, into which a reference to the model and basis (e.g., a record in the form of [Model-ID, Basis-ID]) is inserted. The fully populated hash table is intended to provide a representation of the model that is invariant to affine transformations, and contains sufficient information to enable a match to be made, even when an object is partially occluded.

As is well known in the art, object recognition commences by acquiring an image of the object (e.g., using a gray-scale digital camera), and processing the image to detect geometric features. As with the model, a set of these features is used as a basis for a respective coordinate system, within which the locations of each of other geometric features are calculated. These calculated coordinates are used to access corresponding bins of the hash table. If an accessed bin contains a record (e.g. in the form of [Model-ID, Basis-ID]), then that record is accorded a vote or more generally a proximity score is computed. The records that accumulate the largest significant number of votes or the highest score are adopted as candidates, and extracted for further analysis. The hypothesis is that the model referenced by the record with the highest number of votes or the highest score most closely corresponds to the target image, and the proper transformation of that model into the target image can be computed from the basis identified in that record.

This object recognition algorithm and essentially its improved versions present some important advantages regarding object recognition (See "A probabilistic Approach to Geometric Hashing using Line Features", Frank Chee-Da Tsai, Technical Report No. 640, Robotics Research Laboratory, Courant Institute of Mathematical Sciences, June 1993, or patent application US2002/0181780 A1 dated Dec. 5, 2002, which is hereby incorporated by reference). It is an algorithm robust to noise and occlusion. However in such algorithms an enormous amount of processing is performed by the CPU. This effectively slows down the recognition step. Accordingly, an implementation that enables faster and reliable recognition of objects remains highly desirable.

SUMMARY OF THE INVENTION

The invention provides a geometric hashing method implementation using both a host processor (also referred to herein as a Central Processing Unit, or CPU) and a texture engine that can be embedded in a Graphical Processing Unit (GPU). This method enables rapid and reliable recognition of heavily occluded objects.

Accordingly, an aspect of the present invention provides a geometric hashing method usable by a machine vision system for model-based recognition of an object. More specifically, in a computer having a texture engine, a method of pattern matching for recognition of objects within an image. The method comprises the following steps: deriving at least one target primitive representative of the image; forming at least one basis from at least one target primitive; in the texture engine, determining, for each one of the at least one basis, an affine invariant representation of the at least one target primitives; and identifying, using the affine invariant representation, at least one predefined model primitives that at least partially matches the at least one target primitives.

In a preferred embodiment of the invention the steps of detecting geometric features, mapping a primitive through a set of geometric features and finally calculating and selecting bases are performed in the same manner as described in US patent application US2002/0181780 A1.

In cases where the acquired image is an archetype image, the primitives may be used as so-called "model primitives", and used to populate a hash table with model data.

In cases where the image is a target image, the primitives can be used as target primitives, and matched to model data previously stored in the hash table. In the present invention, the texture engine may be used in this matching operation. The texture engine permits acceleration of the image recognition process. Once target primitives are derived and target bases defined, the matching operation preferably includes, for each set of one or more target primitives, the following steps: forming at least one basis from at least one target primitives; with the texture engine, computing an affine invariant representation of target primitives; with the host processor, identifying model primitives along with respective bases that at least partially matches target primitives.

The texture engine may then calculate a proximity score of the target primitive and the model primitive for each identified model primitive.

In general, the proximity score can be any measure of the degree of conformance between the target and model primitives.

In order to obtain an indication of the degree of conformance between the target image and the model data stored in the hash table, the proximity scores calculated in respect of each model primitive can be accumulated. Since each model primitive is associated with a respective model basis, a respective sum of the proximity scores calculated in respect of model primitives associated with each model basis can be calculated in the CPU or in the texture engine. The model basis having the highest proximity score can then be selected as a candidate basis for further processing and verification of a match between the selected model (candidate) basis and the considered target basis.

DETAILED DESCRIPTION

The invention provides a geometric hashing method implementation using both a host processor (i.e., a CPU (not shown) and a texture engine 4 that can be embedded in a GPU 15. This implementation enables rapid and reliable recognition of heavily occluded objects.

Figure 1:
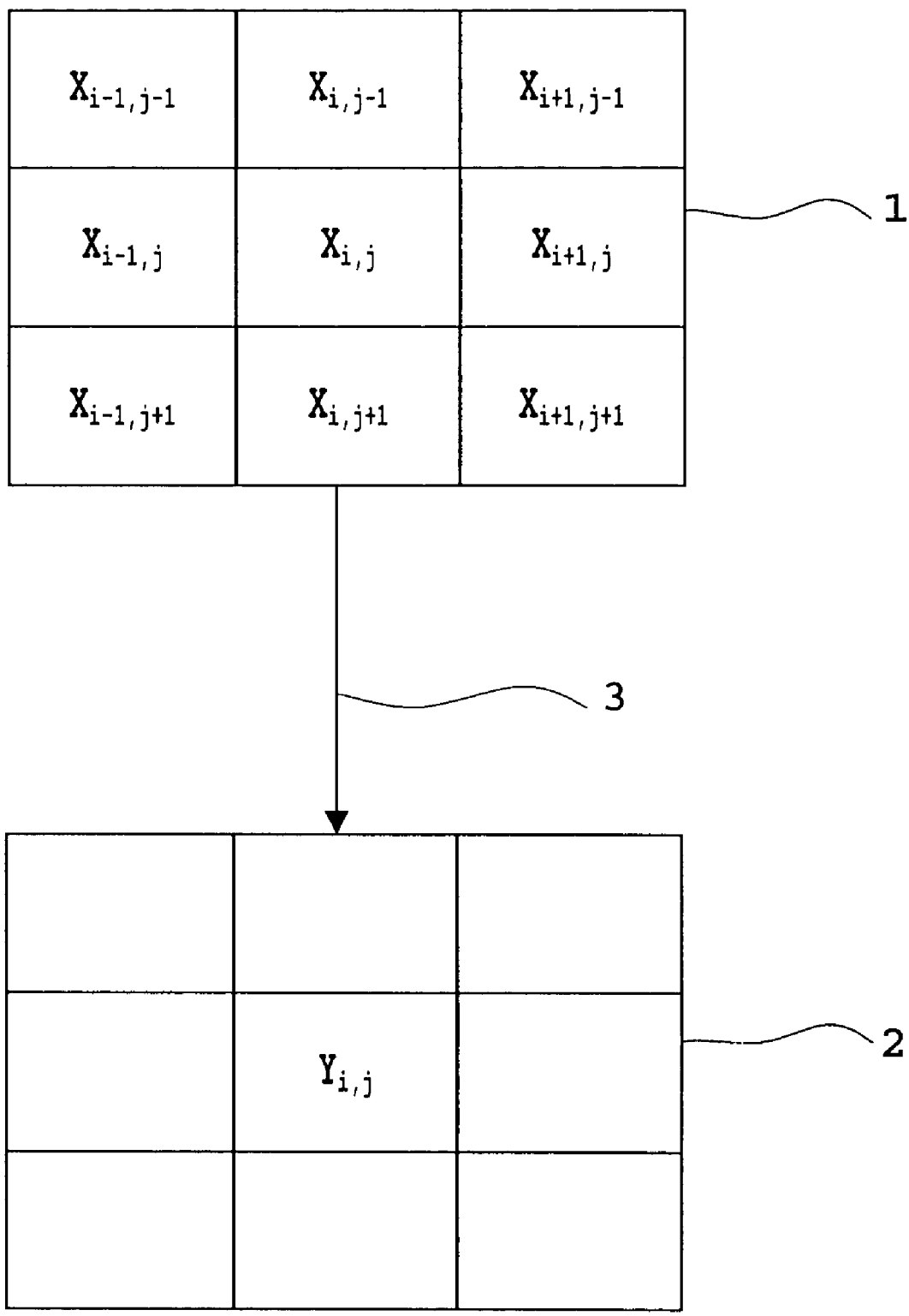
FIG. 1 is a schematic diagram illustrating texture mapping.
Figure 2:
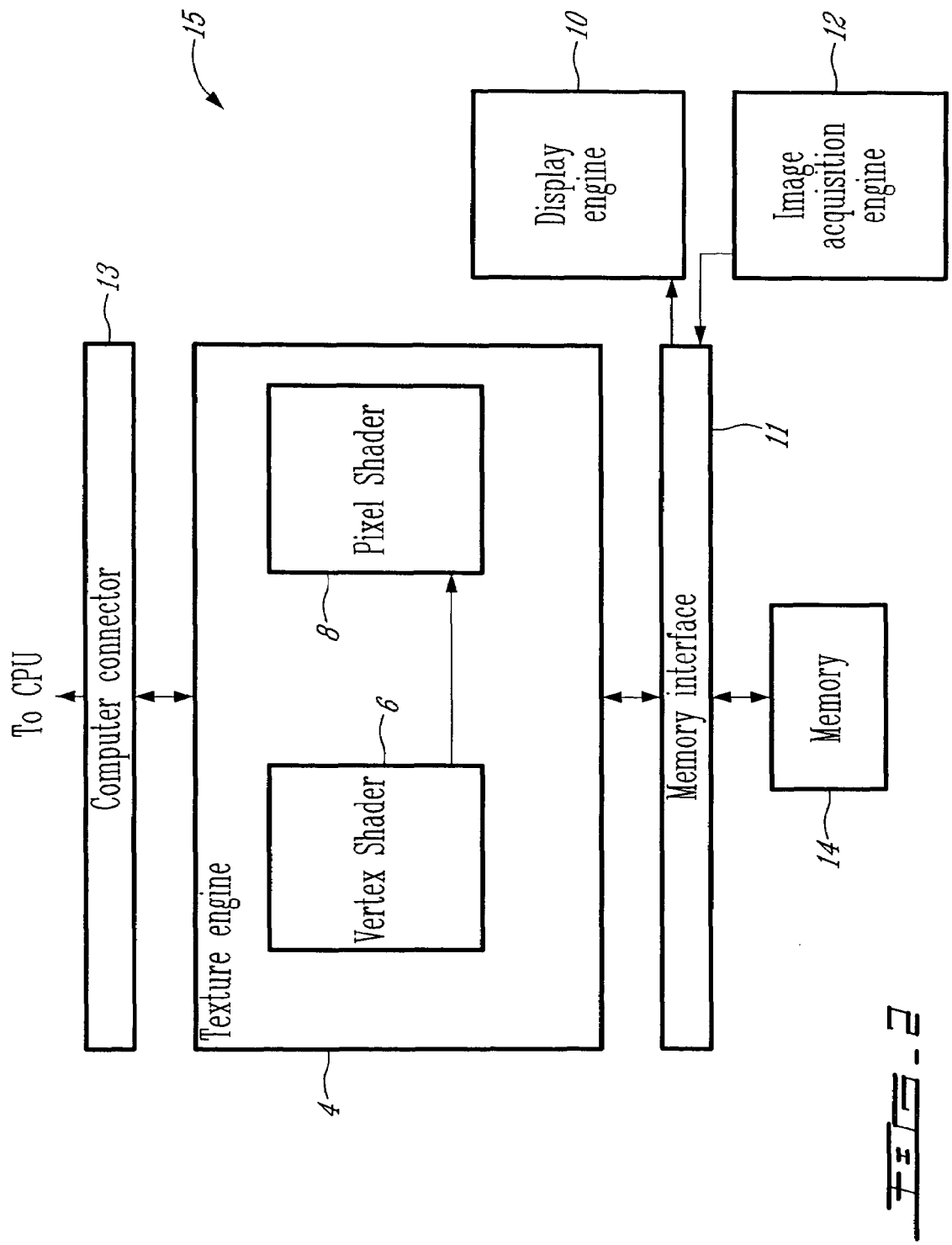
FIG. 2 is a block diagram of a GPU having a texture engine.

Referring to FIG. 1, the basic functionality of the texture engine 4 of FIG. 2 is described. A texture engine is an image array processor with vertex processing and texture mapping capabilities. A texture map associates a destination data array 2 with one or more source data arrays 1 by computing each destination array element according to destination array element position and source arrays elements. For example, a destination array element $Y_{i,j}$ is computed according to corresponding source array element $X_{i,j}$ and its neighboring source elements. The function 3 that calculates a destination element can include basic mathematic functions like interpolation, addition, multiplication, minimum, maximum, etc. Vertex processing includes 2-D and 3-D transformation of geometric primitive coordinates in plane or in space. It also includes processing of other information associated with the geometric primitives such as color.

Texture engine 4 forms part of GPU 15. FIG. 2 shows a typical design of a GPU 15 familiar to a person skilled in the art. GPU 15 comprises a texture engine 4 connected to a display engine 10 and an image acquisition engine 12 through a memory interface 11. A computer connector 13 acts as the interface between the texture engine 4 and the CPU (not shown). Finally, GPU 15 comprises a memory unit 14 connected to the other GPU components through memory interface 11.

The texture engine 4 contains vertex and pixel shaders (6,8). The vertex shader 6 is a programmable component. It can execute a series of operations on vertices composing geometric primitives. The operations include arithmetic operations as multiplications and additions, load and write operations on internal registers. Typically geometric primitives are triangles, line segments or points.

The pixel shader 8 is also a programmable component. It executes a series of user defined arithmetic operations on pixels. These pixels result from the rasterization operation of the transformed data primitives, output by the vertex shader 6. The rasterization is performed either in the pixel shader 8 or by a separate GPU component, the rasterizer (not shown). It is used to transform the primitives output by the vertex shader 6 to a pixel representation, which will allow the display of the image on display engine 10.

The memory unit 14 is used to store input data and output data after processing and a computer connector 13, that allows fast access to RAM.

Display element 10 processes the data in memory unit 14 to convert it to a digital or analog signal that can be displayed on TV screens and computer monitors (i.e., display engine 10).

It also includes, in the preferred embodiment, an acquisition device 12, which allows the GPU 15 to obtain images directly from a camera without using the computer connector 13 to the CPU.

Figure 3:
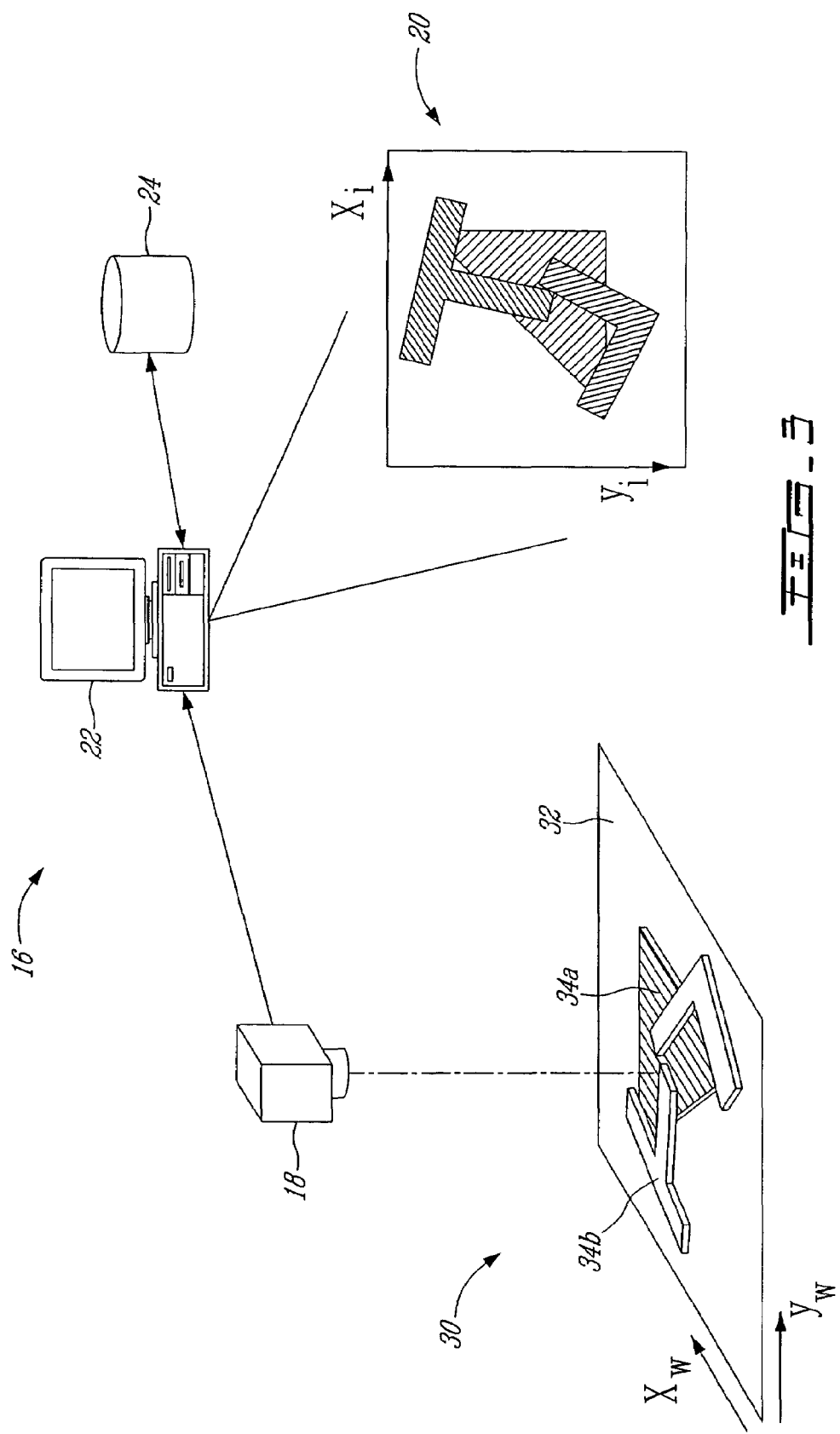
FIG. 3 is a schematic diagram illustrating an exemplary machine vision system in which the present invention may be deployed.

FIG. 3 schematically illustrates an exemplary machine vision system 16 in which the present invention may be deployed.

As shown in FIG. 3, the system 16 comprises an image acquisition device 18 for acquiring an image 20; an image processing system 22 for analyzing the acquired image 20 (and, if desired, displaying the acquired image and/or any analysis results); and a database 24 containing model data regarding one or more models. The image processing system 22 can be provided as any suitable combination of hardware and software comprising a host processor and a texture engine 4 (FIG. 2). In a preferred embodiment, image processing system 22 comprises a suitably programmed computer with a texture engine 4 embedded in the GPU 15 of a graphics card. The database 24 may be located within the processing system 22, or, if desired, stored at a remote location and accessible by the processing system 22 through a network (not shown), if desired.

The image acquisition device 18 (which may, for example, be a digital camera) is arranged to acquire an image of a desired field of view within a predetermined "world space" 30 of the system 16. This world space 30 may, for example, be defined within an inspection station (not shown) of a production line, in order to enable recognition and localization of objects passing through the inspection station. It will be appreciated that other types of image acquisition devices (e.g. electromagnetic imaging devices such as radar and nuclear magnetic resonance imaging systems, or ultra-sonic imaging systems, etc.) may be employed, as may be appropriate for the desired view. In any event, the world space 30 definition includes a "world surface" 32 (which may be a physical or a virtual surface) providing a visual reference frame.

In general, the system 16 operates to recognize objects 34 laying on (or approximately parallel to) the world surface 32, as viewed from the image acquisition device 18. In the embodiment of FIG. 3, the objects include a triangular object 34a which is partially occluded by a pair of other objects 34b-c. In general, a precise alignment between the world surface 32 and an object 34 to be recognized is not essential. Additionally, the world surface 32 can be suitably selected in accordance with the expected geometrical characteristics of objects 34 that are to be recognized. For the purposes of illustrating the present invention, in the embodiment illustrated in FIG. 3, the world surface 32 is a substantially planar rectangular surface lying within the world space 30.

As will be described in conjunction with FIGS. 4 to 9, the method of the present invention comprises two main phases, namely, model definition and pattern matching. Model definition involves calculation of model data in the form of a hash table either by the host processor or by both the host processor and the texture engine 4. This hash table provides a representation of a model that is invariant to at least translation and the rotational orientation of the model in the image. The model data represented in the hash table may also be invariant to scale and/or affine transformations. Pattern matching involves processing an acquired image to compare features of the image to the model data previously stored in the hash table. The texture engine and the host processor perform jointly this step of the processing. The results of this comparison can then be used to select a model as a candidate for an object located in the image or to find the location of a model in the image. In the following paragraphs, model definition is described with reference to FIGS. 4 and 5. Pattern matching is then described with respect to FIGS. 6 to 9.

Model Definition

In general, model definition involves acquiring and analyzing an archetype to derive model data saved in a hash table. The archetype can be any image of the object to be recognized that has clearly distinct edges and no occlusion, in order to facilitate calculation of "good" model data. For example, the archetype may take the form of an image of an instance of the object acquired by the camera 18, and using suitable lighting and background to facilitate high-contrast and therefore clearly distinguishable edges. Alternatively, the archetype could take the form of a so-called "synthetic" description. Such a synthetic description may take any of a variety of forms, such as, for example, a line drawing produced using a computer aided drafting (CAD) software program; an associated drawing file output by the CAD program; or a set of one or more mathematical equations defining the shape of the archetype. In either case, the model data saved in the hash table provides a representation of the archetype that is invariant to at least rotation and translation. If desired, the model data may also be invariant to scale or other affine transformations of the model. Alternatively, separate hash tables may be used to save model data for each of a plurality of predetermined scale steps.

Figure 4:
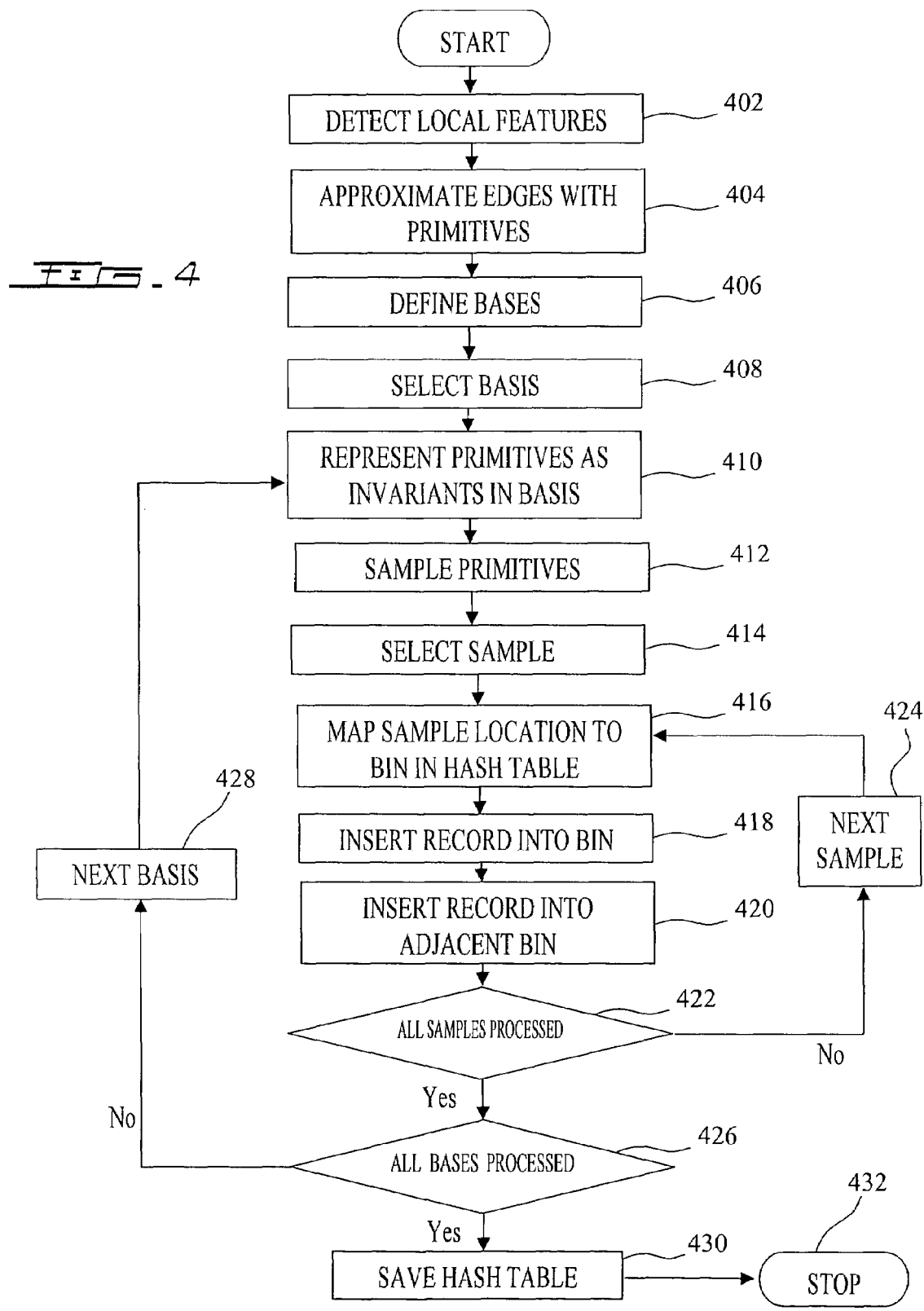
FIG. 4 is a flow chart illustrating steps of preparing a hash table containing model data in accordance with an embodiment of the present invention.

As shown in FIG. 4 model definition comprises the steps of detecting geometric features (402), approximating edges with primitives (404), defining bases using geometric primitives (406), and finally fill the hash table with appropriate records (408-420).

In a preferred embodiment, model definition is performed as described in co-pending patent application number US2002/0181780 A1 dated Dec. 5, 2002. In the foregoing application, geometric features are edge point coordinates and geometric primitives are line segments approximating model edges. Each model basis is derived using a single primitive.

In another preferred embodiment, geometric primitives are, as defined in classical geometric hashing methods, interest points. In a preferred embodiment, the steps described above are performed, but model bases are defined using three primitives.

In yet another preferred embodiment, the texture engine 4 is used in collaboration with the host processor to perform some steps of the model definition. Texture engine 4 is used to represent model primitives as invariants in a model basis (step 410). Texture engine 4 can also be used to map transformed primitives to bins in a hash table (step 416).

Figure 5:
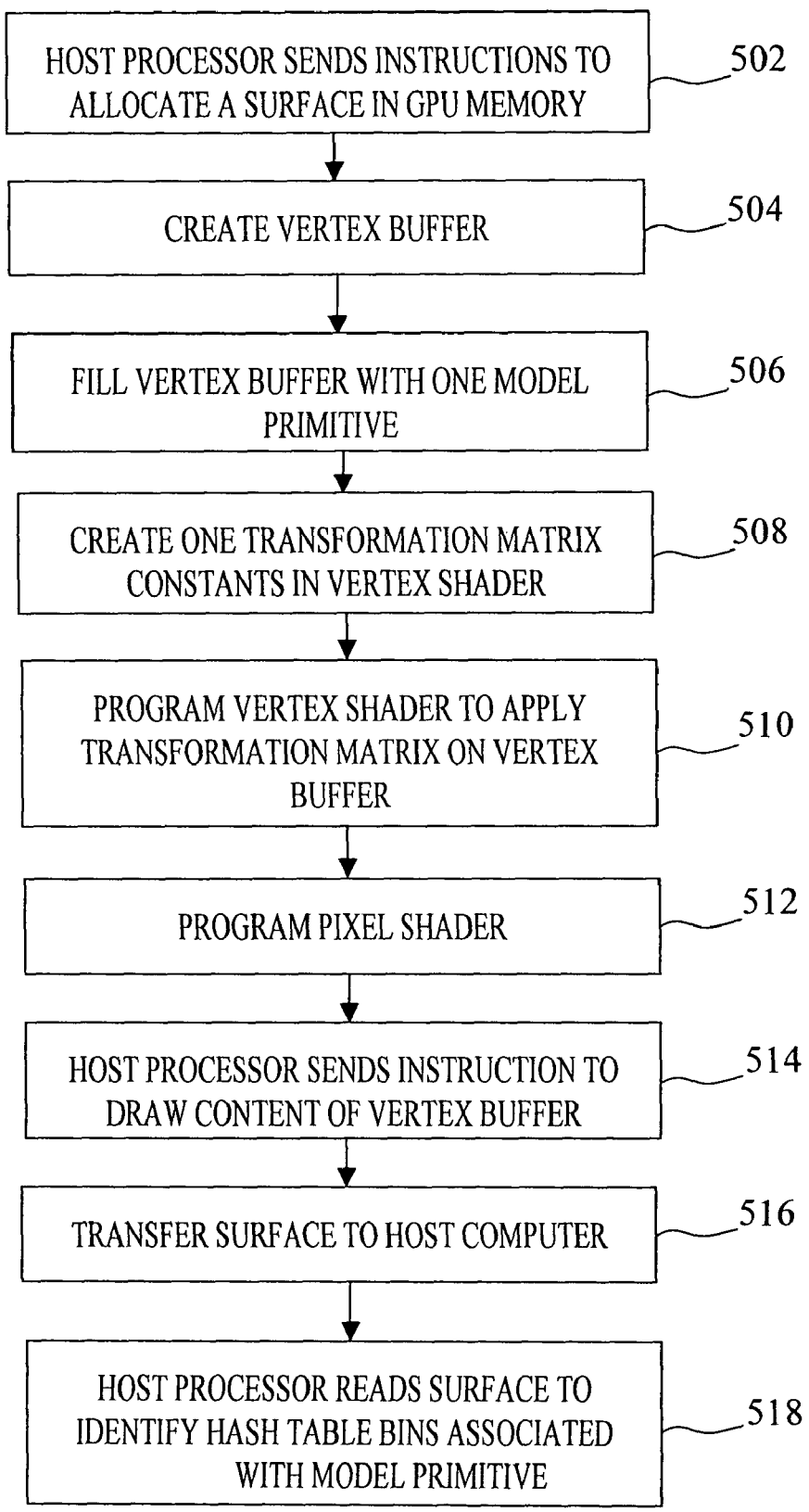
FIG. 5 is a flow chart illustrating steps of the process of preparing a hash table in a preferred embodiment.

FIG. 5 shows the details of an embodiment of the invention where both texture engine 4 and the host processor perform model definition. First at step 502, the host processor allocates a surface in a memory accessible by the texture engine 4, such as the GPU local memory 14, which is the same dimension or larger than the hash table. Texture engine 4 is programmed such that it will use this surface as the render target for its rendering operation.

Then, at steps 504, 506, a vertex buffer, which is allocated in the GPU local memory 14 or in the host processor memory, is filled with information about a model primitive.

In the case where the primitives are line segments, the information about one primitive is stored in two consecutive vertices containing the coordinates of the segment extremities in the model coordinates. The primitive can also be represented as a more complex shape that will include the error tolerance that should be included in the construction of the hash table. A line segment can for example be represented as a rectangle with a given thickness.

In the case where the primitives are interest points, the information is stored in a vertex containing the coordinates of this point. In the same manner as above, a point can be represented by a more complex shape, a square for example, to handle the error tolerance.

At step 508, a model basis is transferred to the texture engine as a matrix of constants to be stored in the vertex shader 6. This matrix performs the transformation (translation, rotation, scaling) that brings coordinates from the model image space into the model basis space and that executes the translation and scaling needed to obtain a coordinate in the hash table.

The vertex shader 6 of the texture engine 4 is programmed (step 510) such that it will apply the foregoing transformation matrix on the primitive information and it will transfer to the rasterizer the transformed primitive information as a position to render the primitive in the render target surface. The pixel shader 8 of the texture engine 4 is programmed (step 512) such that it writes a constant color in the render target surface for each position passed by the rasterizer.

Then, at step 514, the host processor sends instructions to the texture engine 4 to draw the content of the vertex buffer in the render target surface.

In the next step (516), the render target surface is transferred to the host processor, either using read operations initiated by the host processor or by direct memory accesses (DMA) initiated by the GPU 15 in which the texture engine 4 is embedded. By finding the pixels of the surface that have been written by the GPU 15, the host processor can identify the hash table bins that are intersected by the model primitive represented in the model basis (step 518).

These processing steps are repeated for all model bases and all model primitives in order to completely fill the hash table.

Pattern Matching

Figure 6:
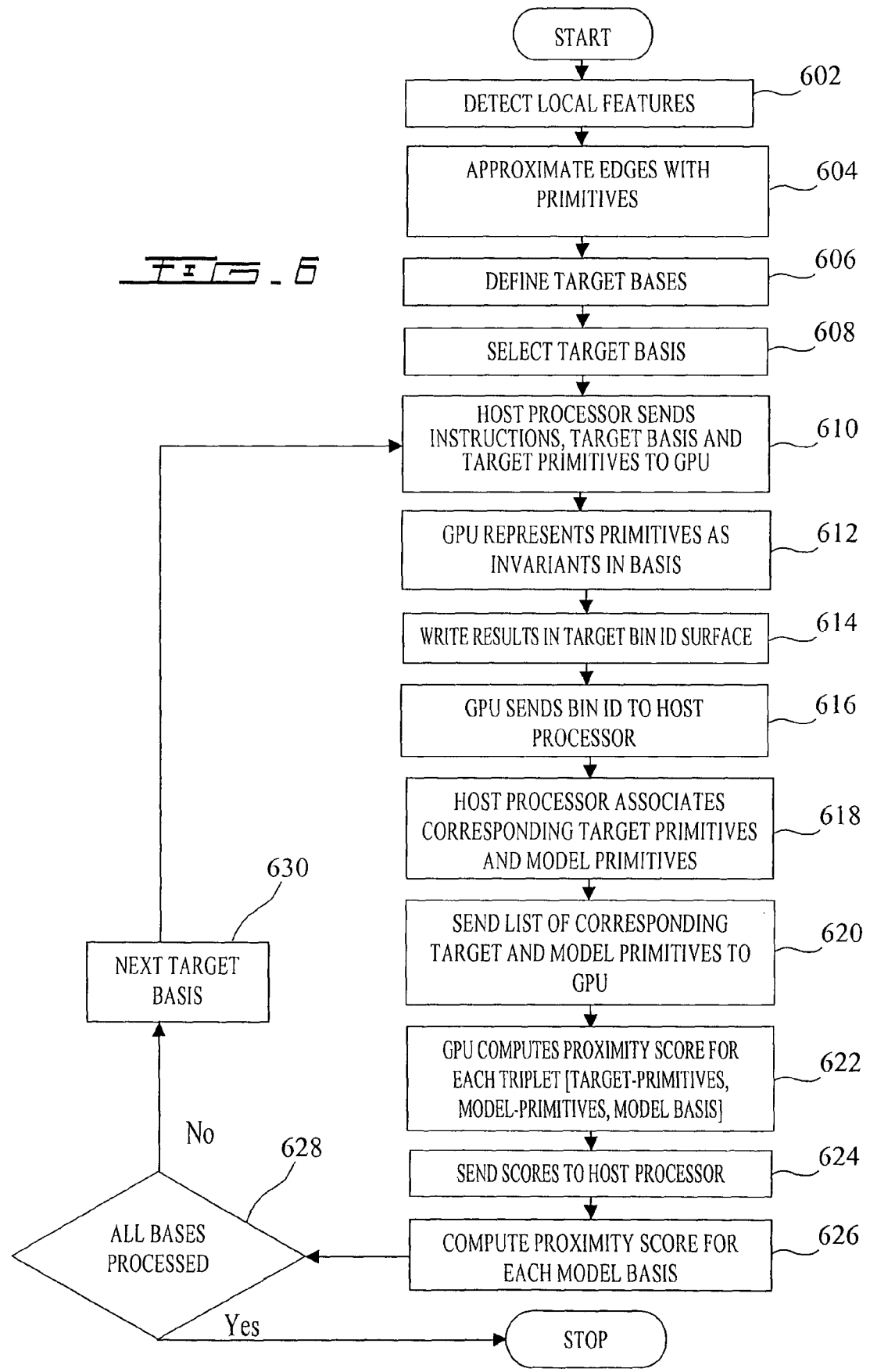
FIG. 6 is a flow chart illustrating principal steps of an image matching process.

In general, pattern matching involves acquiring and analyzing an acquired target image to find an occurrence of a previously defined model within the target image. FIG. 6 is a flow chart illustrating principle steps in a pattern matching process in accordance with the present invention. The process of analyzing an acquired image 20 to detect the set of local features; approximating edges with primitives; defining bases; and selecting a basis closely follows the corresponding steps 402-408 described above for obtaining model data. As shown in FIG. 6, steps 602-608 are performed by the host processor. However, step (612) of representing the primitives as invariants in the selected basis is performed by the texture engine 4.

Figure 9C:
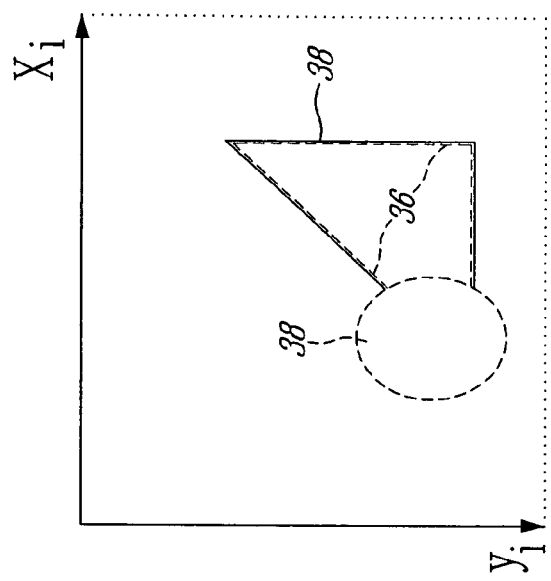
FIGS. 9a, 9b and 9c is a schematic diagram illustrating steps in the process of FIG. 6.
Figure 9B:
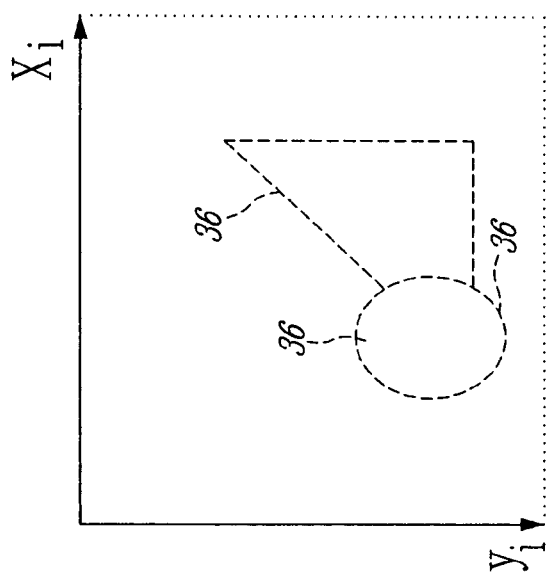
Figure 9A:
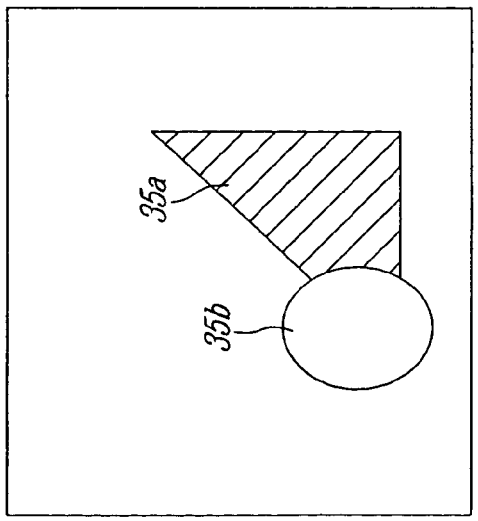

Thus the camera 18 acquires an image 20 of the world space 30, which includes a target object 34a that is to be recognized. FIG. 9a shows an exemplary acquired image containing one target object 35a, and another object 35b partially occluding the target object 35a. Local features (36) within the acquired target image 20 are detected (FIG. 9b). The set of local features are then processed to define target primitives (38) approximating edges within the target image (at FIG. 9c), using the same method described above for analyzing the acquired model image. Similarly, multiple bases are derived from the target primitives, again using the same methods described in FIG. 4.

Once target bases have been derived, the host processor selects one target basis (608) and sends it with the set of target primitives (step 610) to the texture engine 4.

The selected target basis is represented as a matrix transformation to be applied on the target primitives. This matrix performs the transformation (translation, rotation, scaling) that brings coordinates from the model image space into the model basis space and that executes the translation and scaling needed to obtain a coordinate in the hash table. The target primitives and the matrix are respectively sent to the texture engine 4 in a vertex buffer (in GPU local memory 14 or in host processor memory) and a matrix of constants. The texture engine 4 is then programmed to transform the vertices according to the matrix and to write the result in a surface in memory accessible by the texture engine 4, e.g., the GPU local memory 14. At the end of this operation (step 612-614), the surface contains data identifying the hash table bins for each transformed target primitive.

Figure 7:
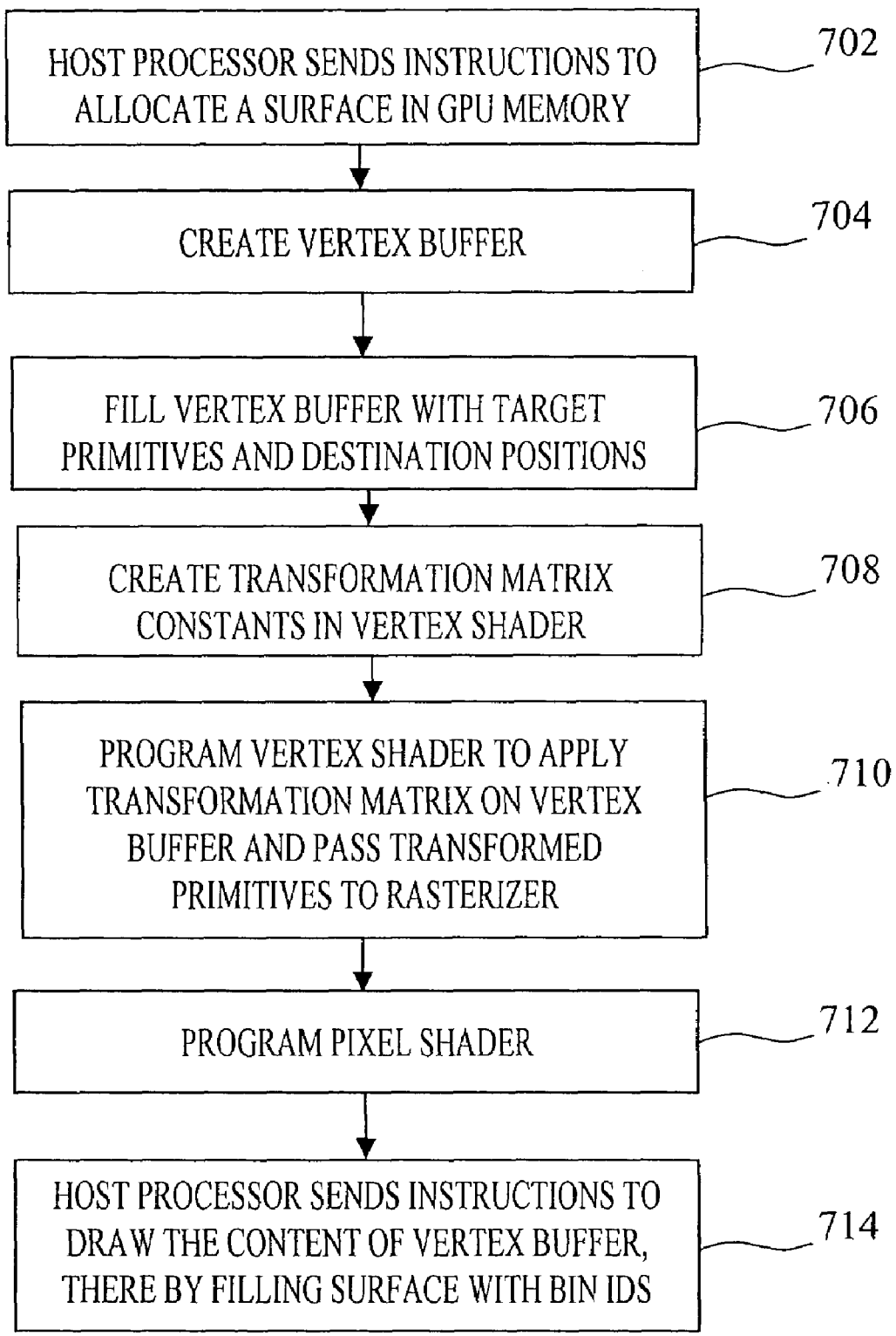
FIG. 7 is a flow chart illustrating, in further detail, some of the steps in the matching process.

FIG. 7 shows in more detail steps 610-614 of the pattern matching process. The host processor sends instructions (step 702) to allocate a 2D surface in memory accessible by the texture engine namely the "target bin id surface". This surface is created with dimensions such that the results of the bin id calculation can be written in it without any collision between results for different target primitives. The texture engine is set such that it will use this newly created surface for its rendering operation.

Then at step 704, a vertex buffer is created in the GPU local memory 14 or in the host memory (not shown) and filled (706) with information about the target primitives and about a specific position in the "target bin id surface" where the texture engine 4 should write a result for each target feature processing. In a preferred embodiment, the information about each target primitives is stored in two consecutive vertices. Each vertex holds the (x,y) position of one line segment extremity expressed in pixel or sub-pixel coordinates in the target image. The host processor assigns a series of consecutive pixels in the "target bin id surface" into which the texture engine 4 will store the result for this target primitive. The number of pixels in this series corresponds to the length of the line segment (expressed in pixels of the target image). The coordinates of the extremities of this series are stored in the two vertices associated with this target primitive. In another embodiment, in the case where geometric primitives are interest points, each target primitive is stored in one vertex and the number of pixel used to store the result is one.

Then, at step 708, the matrix of constants is loaded in the texture engine vertex shader 6. This matrix is used to transform the target primitives coordinates into coordinates in the hash table. At step 710, the vertex shader 6 is programmed to transform the target primitive information using the given matrix and to transfer to the rasterizer the transformed target primitive information and the destination position in the "target bin id surface". The transformed target primitive information is transferred to the rasterizer as if it was the color data associated with the transformed vertex. For example, it can transfer in the Blue diffuse color component the transformed target feature information representing the column position in the hash table and in the Green diffuse color component the transformed target feature information representing the row position in the hash table. Then, at step 712, the pixel shader 8 is programmed to use directly the color information supplied by the rasterizer as the output in the render target. Since the color represents transformed target primitives expressed in hash table coordinate system, the coordinates will be written in the "target bin id surface". The output position in this surface is determined by the rasterizer according to the destination position that was contained in the vertices.

Finally, the host processor sends the command to the texture engine 4 to draw in the render target surface the primitives defined by the vertices in the vertex buffer (step 714). The texture engine 4 will fill the "target bin id surface" at positions specified by the vertex buffer. Between the target surface pixel series extremities specified in each vertex pair, the texture engine rasterizer will calculate the interpolated values of the transformed hash table position, therefore generating hash table bin coordinates crossed by the transformed line segment.

The next step of the matching process is to associate model primitives to corresponding target primitives. At step 616, The host processor retrieves the information about the bin id's that are associated with each transformed target primitive, either using read operations initiated by the host processor or by direct memory accesses (DMA) initiated by the GPU 15 in which the texture engine 4 is embedded. The host processor uses this information and the hash table to determine couples of [Target_Primitive_ID, Model_Primitive_ID], which intersect in the hash table and it outputs a list of triplets [Target_Primitive_ID, Model_Primitive_ID, Model_basis_ID] (step 618).

Figure 8:
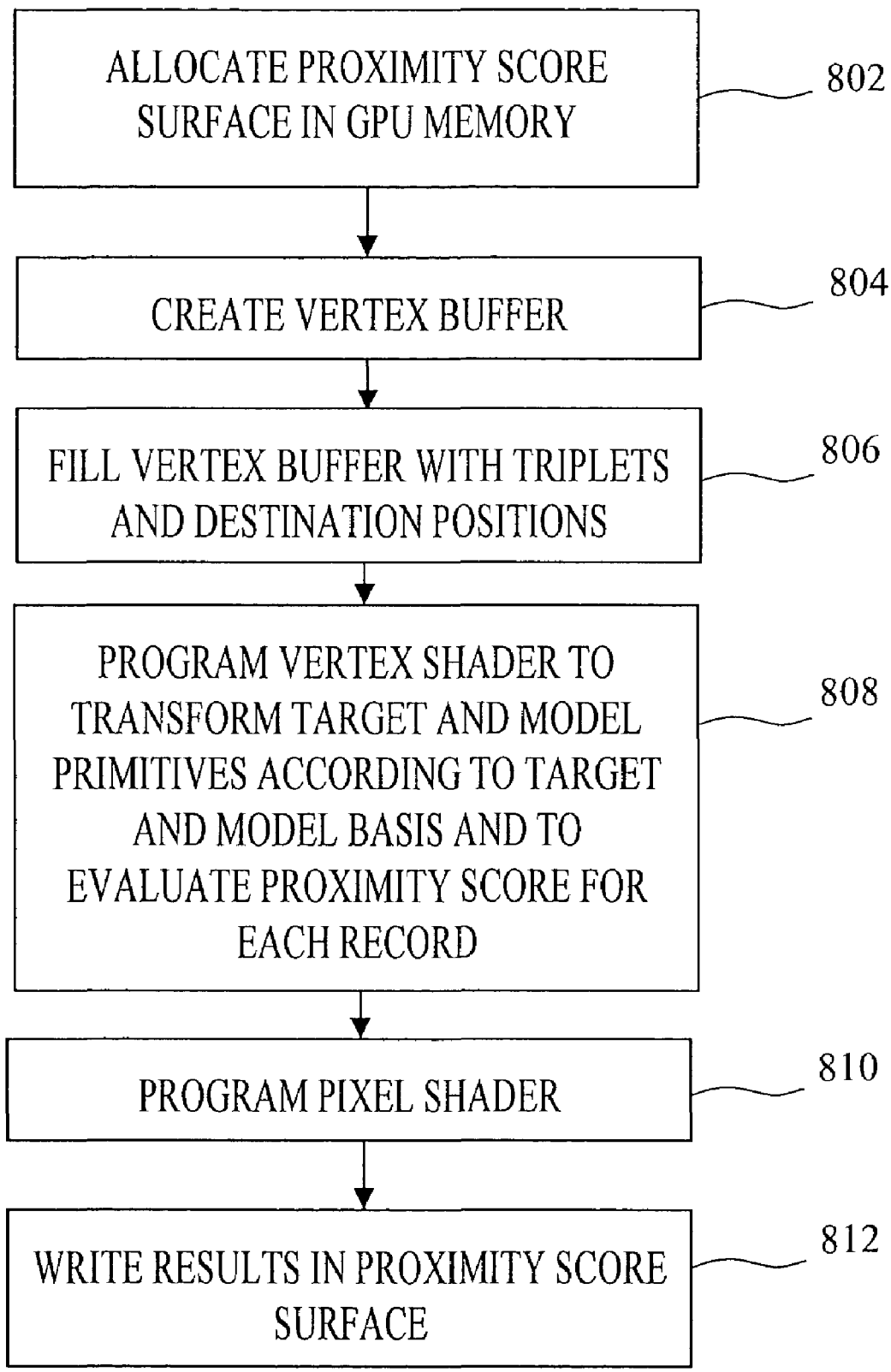
FIG. 8 is a flow chart illustrating steps for computing proximity scores between matching target primitives and model primitives.

Once all the triplets of corresponding primitives are determined, at step 618 the host processor sends the list of these triplets to the texture engine 4 (step 620). The proximity score is then computed (step 622) for each target primitive and model primitive couple. FIG. 8 shows step 622 in more detail. The host processor allocates a surface in the memory accessible by the texture engine (step 802). This surface, namely the proximity score surface, is set as the render target of the texture engine rendering operation and is created with appropriate dimensions such that the results of the proximity score calculation can be written in it without any collision.

Then, at step 804, a new vertex buffer is created according to the list of [Target_Primitive_ID, Model_Primitive_ID, model_Basis_ID] records, in the current target basis. Each vertex contains the information about one record. It also contains a destination position to output the calculated value in the "proximity score surface" (step 806).

In a preferred embodiment, the information about primitives is the coordinates, expressed in pixel or sub-pixel accuracy in the model or target space. As for the target basis, the information about the model basis is the transformation matrix associated with this basis.

Alternatively, the information about model primitives and or bases can be stored as constants in the texture engine vertex shader 6 and each vertex can contain only the index for addressing these constants. As shown in FIG. 7 step 708, the information about the current target basis is already stored into the texture engine vertex shader as constants representing the transformation matrix associated with this basis. Then, the texture engine 4 is set such that it will use this newly created vertex buffer for its rendering operation.

The host processor loads also a program in the vertex shader 6 (step 808) that processes each vertex by transforming the target primitive and the model primitive according respectively to the target basis and the model basis and by evaluating a proximity score between these two transformed primitives.

In a preferred embodiment, wherein primitives are line segments, the proximity score is the length of the transformed model primitive line sub-segment that lies at a distance less than a constant from any point on the transformed target primitive. The vertex shader 6 is programmed to perform this calculation and to output the proximity score as the color information to be passed to the rasterizer.

Then, at step 810, a program is loaded in the texture engine pixel shader 8 that uses directly the color information supplied by the rasterizer as the output in the render target. The host computer sends, at step 812, the commands to draw the primitives contained in the vertex buffer. Since the color represents proximity score, this score will be written, in the "proximity score surface". The output position in this surface is determined by the rasterizer according to the destination position that was contained in the vertex buffer. The primitives to draw in the proximity score surface are only one color point for each vertex, with the color representing the proximity score.

Finally, at step 624, the proximity scores are transferred to the host processor, either using read operations initiated by the host processor or by direct memory accesses (DMA) initiated by the GPU 15. Then the host processor computes a total proximity score for each model basis (step 626).

The proximity score summation can also be done in the texture engine 4 by filling the vertex buffer such that all proximity scores for the same model basis are written in the same location of the proximity score surface and by programming the texture engine such that it adds all values written at a location. At the end of this processing, a list of proximity scores is obtained for each model basis according to the chosen target basis.

Upon completion of the analysis, a check is performed (step 628) to determine whether all of the target bases defined have been processed. If any target bases remain unprocessed, then a next target basis is selected (step 630), and processing restarts at step 610. These steps are repeated until each target basis has been processed or until an acceptable match is found for one basis. Some of the steps can be skipped in the new iterations of the processing. For example, one vertex buffer already contains the target primitive information and can be reused without modification.

Since the described algorithm includes parts that are performed by the host processor and others by the texture engine 4, and since it should be repeated for many target bases, it could be partly made parallel. The host processor can make some operations needed for one target basis while the texture engine is doing some operations needed for another target basis.

The embodiment(s) of the invention described above is(are) intended to be exemplary only. The scope of the invention is therefore intended to be limited solely by the scope of the appended claims.

The invention claimed is:

1. In a computer having a texture engine, a method of pattern matching for recognition of objects within an image, the method comprising:
   deriving at least one target primitive representative of the image;
   forming at least one basis from said at least one target primitive;
   in the texture engine, determining, for each one of said at least one basis, an affine invariant representation of said at least one target primitives; and
   identifying, using said affine invariant representation, at least one predefined model primitives that at least partially matches said at least one target primitives.

2. The method as claimed in claim 1 wherein determining said affine invariant representation comprises applying a transformation matrix on said target primitives.

3. The method as claimed in claim 2 wherein applying said transformation matrix comprises defining said transformation matrix using said at least one basis.

4. The method as claimed in claim 1 wherein said computer further comprises a host processor, and wherein said deriving, said forming and said identifying are performed in said host processor in parallel with said determining performed in said texture engine.

5. The method as claimed in claim 1 further comprising storing said affine invariant representation in a surface in memory accessible by said texture engine.

6. The method as claimed in claim 5 wherein said texture engine further comprises a vertex buffer, said vertex buffer receiving said at least one target primitive.

7. The method as claimed in claim 6 wherein determining said affine invariant representation comprises applying a transformation matrix on said target primitives.

8. The method as claimed in claim 7 wherein applying said transformation matrix comprises defining said transformation matrix using said at least one basis.

9. The method as claimed in claim 8 wherein said texture engine further comprises a vertex shader, said vertex shader applying a transformation matrix on said at least one primitive.

10. In a computer having a texture engine, a method of pattern matching for recognition of objects within an image, the method comprising:
    deriving at least one target primitive representative of the image;
    forming at least one basis said at least one target primitive;
    determining, for each one of said at least one basis, an affine invariant representation of said at least one target primitives;
    identifying, using said affine invariant representation, at least one predefined model primitives that at least partially matches said at least one target primitives; and in said texture engine computing, for said affine invariant representation, a proximity score indicative of the degree of conformance between the identified model primitives and said target primitives.

11. The method as claimed in claim 10 wherein computing said proximity score comprises:
applying a target matrix transformation to said at least one target primitives;
applying a model matrix transformation to said at least one model primitives; and
in said invariant representation, computing a transformed proximity score indicative of the degree of conformance between the transformed model primitives and said target primitives.

12. The method as claimed in claim 11 wherein applying said target transformation matrix to said at least one target primitives comprises defining said target transformation matrix using said at least one target basis, and wherein applying said model transformation matrix to said at least one model primitives comprises defining said model transformation matrix using said model basis.

13. A computer used for recognition of objects within an image, said computer comprising:
a host processor receiving said image, deriving at least one target primitive representative of the image and forming at least one basis from said at least one target primitive;
a texture engine, connected to said host processor, for determining, for each one of said at least one basis, an affine invariant representation of said at least one target primitives; and
said host processor for identifying, using said affine invariant representation, at least one predefined model primitives that at least partially matches said at least one target primitives.

* * * * *